United States Patent Office 2,932,071
Patented Apr. 12, 1960

2,932,071

GLASS REINFORCED METALS

Harry B. Whitehurst, Newark, Ohio, assignor to Owens-Corning Fiberglas Corporation, a corporation of Delaware No Drawing. Application October 19, 1956
Serial No. 616,926

9 Claims. (Cl. 22—202)

This invention relates to glass reinforced metals, and, more particularly, to metal articles reinforced with glass, for example in fibrous or flake form, which is not wet by the particular metal of which the article is composed.

Various suggestions have heretofore been made for producing metal coated glass fibers or flakes, and for producing metallic and other articles reinforced with such glass fibers or flakes by processing of the coated materials (see U.S. Patent 2,699,415, for example). A method for producing "curly" glass fibers coated with a metal has been specifically suggested. Such method involves pulling one side of a fiber-forming stream over a surface, which may be flat or arcuate and then through a globule of molten metal. Contact between the fiber and the surface tends to stabilize the metal-coating operation, and to convert the fiber produced to a curly form.

Specific examples of suggested uses for metal coated glass fibers include the production of reinforced metal articles by either hot or cold pressing, in suitable dies, of masses of the coated fibers or flakes. Best results, using this technique, have been achieved by hot pressing in a hydrogen atmosphere, although some evidence of welding was noted even with cold pressing. Similar results have been noted when masses of fibers or flakes either bare or metal coated, were sandwiched between sheets of metal foil and subjected to pressure, preferably at elevated temperatures.

Electrically conducting masses have also been produced by fabricating the metal coated fibers into a scrim fabric, and then embedding the scrim in a suitable synthetic resinous material such as polyethylene.

It has been found, however, that certain metals do not wet available fiberizable glasses when presently available techniques, which are satisfactory to metal-coat glass fibers with certain other metals, are employed. Instead of forming uniform coatings on fibers, such metals tend to collect in small balls or globules at spaced intervals along the length of the fiber, with bare glass between. The resulting fibers with discrete globules of the non-wetting metal adhered thereto at spaced intervals cannot be formed into solid metal articles reinforced with fibrous glass unless the reinforced metal is different from that adhered in globules to the fibers, and, specifically, is one of the metals which wets the fibers. As a consequence, it has heretofore been necessary, when it was desired to produce a metal article reinforced with glass fibers, rods, rodlets, or flakes, for the metal to be one which wet the particular glass reinforcement.

The present invention is based upon the discovery that it is possible to produce glass-reinforced metal articles using glass reinforcement which is not wet by the particular metal of which the article is composed.

It is, therefore, an object of the invention to provide an improved method for producing glass-reinforced metal articles.

It is a further object of the invention to provide such a method for producing articles composed of a metal which does not wet the glass reinforcement.

It is still another object of the invention to provide metal articles reinforced with a glass which is not wet by the metal.

Other objects and advantages will be apparent from the description which follows, which is intended only to illustrate and disclose, but in no way to limit, the invention.

According to the invention a method for producing a glass-reinforced metal article is provided. Such method comprises coating glass reinforcement, which may be in the form of fibers, flakes or even rods or rodlets, with a metal which is capable of wetting the glass, intimately associating the metal coated glass reinforcement with a metal, in liquid form, which is incapable of wetting the glass reinforcement, and solidifying the liquid metal.

It will be appreciated that the ability of any particular metal, when in a liquid form, to wet any specific glass depends upon the composition of the glass. However, lead and lead alloys usually do not wet glasses that are presently available in fiberized form. Therefore, it has not heretofore been possible to produce lead articles reinforced with fibrous glass. In the case of other metals, however, specific glasses may not be wet, so that a similar problem had heretofore existed in other cases, but is solved by the instant invention.

In general, the metal that is applied to the glass reinforcement, prior to incorporation thereof into a metal to be reinforced, can be of any metal that will wet the particular glass. For example, aluminum, zinc, magnesium, and various alloys can be employed. However, it has been found that the strength of glass fibers, for example, is decreased substantially by application thereto of a coating of a high melting metal. It is believed that this weakening can be attributed to heating of the glass to a relatively high temperature during application of the metal coating. It is usually preferred, therefore, that the metal coating which is applied to glass fibers be a coating of a low melting metal which wets the glass. Most desirably, the coating metal is lower melting than the metal to be reinforced. Thus, where lead is to be reinforced with glass, it is most desirable that the glass first be coated with a metal that melts at a temperature lower than about 327° C., which is the melting point of lead. For example, in this instance, either Wood's metal or Rose's alloy could be used to advantage, as each of these metals is low melting and is capable of wetting glass.

The coating of a metal which wets glass can be applied to the glass reinforcement in any desired suitable manner. Excellent results have been achieved by coating continuous glass fibers, immediately after formation, by drawing the fibers through a globule of the molten coating metal. If desired, prior to passage through the globule of molten metal, the fibers can be drawn over a surface to impart "curliness" to the coated fibers used for reinforcement. The glass reinforcement can also, if desired, be introduced into a bath of the desired coating metal, removed from the bath and separated from excess metal, for example by a draining or centrifuging operation.

It has been found to be advantageous, in producing a glass reinforced metal article from metal coated glass reinforcement, to provide an exterior oxide coating on the metal coated reinforcement, where such exterior coating is an oxide of the metal to be reinforced. As a specific example of this phenomenon, the fabrication of reinforced bodies from aluminum coated glass fibers can be facilitated, and a sounder glass reinforced aluminum body can be produced, if an aluminum oxide coating is provided on the surface of the aluminum coating to act as a coupling layer. This phenomenon is particularly noticeable when reinforced bodies are produced by hot pressing techniques. It will be appreciated that, in the instant situation, a second metal coating must be provided on the glass reinforcement in order to take advantage of this phenomenon. For example, if glass fibers are coated with Wood's metal in preparation for reinforcement of lead therewith, providing a surface coating of oxidized Wood's metal on the fibers would not facilitate the production of a sound lead reinforced body. However, the fibers, coated with Wood's metal, can subsequently be coated with lead, and the lead coating can then be subjected to oxidizing conditions to provide a lead oxide coupling layer on the exterior of the composite reinforcing material. Such material can then be placed in an appropriate mold and subjected to pressure, and preferably also to heat, in order to form the desired glass-reinforced lead article. Similar techniques can also be employed to provide an appropriate oxidized coating on glass reinforcement for the production of articles of metals other than lead. In each case, however, the coating should be an oxide of the metal from which the article is to be fabricated.

Glass reinforced metal articles can also be produced by positioning glass reinforcement coated with a metal which wets the glass between sheets of foil of the desired metal, and then subjecting the sandwich structures to pressure, and preferably also to heat. Similarly, the glass reinforcement, coated with the wetting metal, can be positioned in an appropriate mold, and the non-wetting metal can be poured into the mold around the coated glass.

Zinc and Wood's metal are specific examples of metals which wet fibrous glass, and which have been applied thereto. Zinc coated glass fibers and zinc coated strands of glass fibers have also been coated with lead, which will not, directly, coat the glass. Glass reinforced lead articles can be fabricated from the zinc and then lead coated glass fibers or strands by pressure, preferably also using heat, as described above, or by casting lead around bundles of the coated fibers or strands. Similarly, glass reinforced lead articles can be produced by casting molten lead around bundles of the zinc coated fibers or strands.

It will be apparent that various changes and modifications can be made from the specific details disclosed herein without departing from the spirit and scope of the attached claims.

What I claim is:

1. A method for producing a glass-reinforced lead article which comprises coating glass reinforcement with a metal which is capable of wetting the glass, intimately associating the metal coated glass reinforcement with molten lead, and solidifying the liquid lead.

2. A method for producing a glass-reinforced lead article which comprises coating fibrous glass reinforcement with a metal which is capable of wetting the glass, intimately associating the metal coated glass fibers with molten lead and solidifying the liquid lead.

3. A method for producing a glass-reinforced lead article which comprises coating glass flakes with a metal which is capable of wetting the glass, intimately associating the metal coated glass flakes with molten lead and solidifying the liquid lead.

4. A method for producing a glass-reinforced lead article which comprises coating glass fibers with zinc, intimately associating the zinc coated glass fibers with molten lead, and solidifying the liquid lead.

5. A method for producing a glass-reinforced lead article which comprises coating glass fibers with Wood's metal, intimately associating the Wood's metal-coated glass fibers with molten lead, and solidifying the liquid lead.

6. A method for producing a glass-reinforced lead article which comprises coating glass fibers with Rose's alloy, intimately associating the resulting coated glass fibers with molten lead, and solidifying the liquid lead.

7. A method for producing a glass-reinforced lead article which comprises coating glass fibers with zinc, positioning a plurality of the resulting zinc-coated glass fibers between sheets of a lead foil, liquefying the metal foil by the action of pressure, and solidifying the liquid lead.

8. A method for producing a glass-reinforced lead article which comprises coating glass fibers with Wood's metal, positioning a plurality of the resulting coated glass fibers between sheets of a lead foil, liquefying the metal foil by the action of pressure, and solidifying the liquid lead.

9. A method for producing a glass-reinforced lead article which comprises coating glass fibers with Rose's alloy, positioning a plurality of the resulting coated glass fibers between sheets of a lead foil, liquefying the metal foil by the action of pressure, and solidifying the liquid lead.

References Cited in the file of this patent

UNITED STATES PATENTS

| | | |
|---|---|---|
| 604,569 | Ringstrom | May 24, 1898 |
| 1,118,812 | Sand et al. | Nov. 24, 1914 |
| 1,778,893 | Forrester | Oct. 21, 1930 |
| 2,424,353 | Essig | July 22, 1947 |
| 2,699,415 | Nachtman | Jan. 11, 1955 |
| 2,772,987 | Whitehurst et al. | Dec. 4, 1956 |

FOREIGN PATENTS

| | | |
|---|---|---|
| 171,932 | Australia | July 25, 1952 |